United States Patent [19]

Hogenhout

[11] Patent Number: 4,597,282
[45] Date of Patent: Jul. 1, 1986

[54] METHOD AND APPARATUS FOR COLDWORKING HOLES

[75] Inventor: Franciscus Hogenhout, Redmond, Wash.

[73] Assignee: West Coast Industries, Inc., Seattle, Wash.

[21] Appl. No.: 669,670

[22] Filed: Nov. 8, 1984

Related U.S. Application Data

[63] Continuation-in-part of Ser. No. 458,282, Jan. 14, 1983, abandoned.

[51] Int. Cl.⁴ ............................................. B21D 41/02
[52] U.S. Cl. ........................................ 72/370; 72/393
[58] Field of Search ..................... 72/370, 392, 393; 29/157.3 C, 252

[56] References Cited

U.S. PATENT DOCUMENTS

| | | | |
|---|---|---|---|
| 2,357,123 | 8/1944 | Maxwell | 72/393 |
| 2,480,630 | 8/1949 | Brinen et al. | 72/393 |
| 2,508,377 | 5/1950 | Doerr | 72/393 |
| 2,974,712 | 3/1961 | Frye et al. | 72/393 |
| 3,566,662 | 3/1971 | Champoux | 29/446 |
| 4,262,518 | 4/1981 | Creger et al. | 72/393 |

FOREIGN PATENT DOCUMENTS 192159  2/1967  U.S.S.R. .................................. 72/393

Primary Examiner—Lowell A. Larson
Attorney, Agent, or Firm—Mark Zovko

[57] ABSTRACT

A method and apparatus for coldworking of holes using a split mandrel. The apparatus uses a mandrel having radially directed slots to permit contraction of its outer diameter as it is fitted within a hole. The mandrel contains a pilot having a larger diameter extending from the mandrel. After placing the mandrel and pilot within a hole to be coldworked, the pilot is pulled into the mandrel solidifying the mandrel. The pilot and mandrel are then withdrawn through the hole, thereby coldworking the hole.

5 Claims, 7 Drawing Figures

METHOD AND APPARATUS FOR COLDWORKING HOLES

CROSS REFERENCE TO RELATED APPLICATION

This application is a continuation-in-part of my co-pending application Ser. No. 458,282 filed Jan. 14, 1983, now abandoned.

BACKGROUND OF THE INVENTION

1. Field of the Invention

This invention relates in general to coldworking of holes, and more particularly, to a method and apparatus for coldworking holes, thereby increasing their fatigue life especially in workpieces under stress. This process is especially necessary in the manufacture of airplane wings and body structures.

2. Description of the Prior Art

In the coldworking process, a mandrel of a diameter larger than a hole is pulled or pushed through the hole to expand the hole radially, displacing the material immediately surrounding the hole beyond the elastic limit of the material. Parts having holes in them which are processed in this manner will exhibit improved fatigue life. Conventionally three basic methods of coldworking holes are known in the industry today.

The first method employs a solid mandrel. The solid mandrel has two different diameters and is employed in conjunction with a puller gun. One diameter is sized to just clear the hole to be coldworked, and the other diameter is dimensioned for coldworking. The two diameters are joined by a tapered section to permit a smooth displacement of the material surrounding the hole. This method requires two operators. One operator pushes the small diameter of the mandrel through the hole, and the other operator engages the mandrel with a puller gun and subsequently pulls the large diameter of the mandrel through the hole. Several disadvantages of this method exist. First, the pressures of the workpiece against the coldworking tool and very high, somewhere between the tensile and bearing yield strength of the material being coldworked. This high pressure can cause galling and tool breakage. Another disadvantage is that an operator is required at each side of the workpiece. This mandrel is partly pushed from one direction through the hole by the first operator and attached to a puller gun by a second operator, after which the mandrel is pulled through. Further, the mandrel now has to be returned to the first operator by circumventing the structure containing the hole.

A second method for coldworking holes employs a split mandrel, such as that shown in U.S. Pat. No. 2,357,123, issued to Maxwell. Although the preferred embodiment of the present invention employs a split mandrel, this older method as taught by Maxwell is much different.

Maxwell teaches a split mandrel assembly consisting of a split mandrel on the outside and a tapered pilot on the inside. The tapered pilot enters the hole first, then the split mandrel in its collapsed position also enters and passes through the hole. The tapered pilot is now drawn into the split mandrel thereby expanding the outside diameter of the split mandrel. Subsequently, a shoulder on the tapered pilot seats against the end of the split mandrel and begins to push the expanded split mandrel through the hole, thereby effecting coldworking. This method requires only one operator and is relatively fast.

All of the load of pulling, however, is carried by the tapered pilot. The small diameter of the tapered pilot makes the pilot unable to bear such high loads and the tool may fail prematurely. Also, since the split mandrel segments are in compression, they must be sturdy enough not to collapse. The mandrel, therefore, is split only one time into two halves. This results in holes which are oval in shape and therefore of inferior quality. Additionally, because the pilot is tapered, it is difficult to maintain the accuracy of the outside diameter of the expanded split mandrel. Further, the split mandrel generates ridges in the coldworked hole. These ridges reduce the quality of the coldworking, and impact the subsequent reaming operation making it more difficult to produce a quality finish. Finally, in this method the tapered pilot is pulled into the mandrel under a preloaded condition causing premature wearing of the tapered portion of the pilot and the mating surface of the mandrel.

A third method, and one that is quite prevalent today, is the split sleeve and solid mandrel tool. This method described in the U.S. Pat. No. 3,566,662, issued to Champoux permits a single operator to cold work a hole from one side by first introducing a solid mandrel having a reduced diameter portion. A split sleeve rests on the reduced diameter portion during entry into the hole. Then the split sleeve is retained in the hole by the housing of the puller gun while the larger diameter portion of the mandrel is pulled through the split sleeve. It is easy to see several advantages of this presently preferred method: The use of only one operator, the durability of the tool because the tensile stress occurs in a member with a large sectional area, and any slipping occurs between the sleeve and the mandrel, rather than the mandrel and the hole. However, non-symmetrical coldworking is inherent in this method because the sleeve is split only on the side. Also, the operator must install a new sleeve each time a hole is worked, thereby losing time. Also, the sleeves are expensive and must be removed from the hole and discarded.

Another possible relevant patent is U.S. Pat. No. 2,974,712 issued to Frye et al. Frye et al's invention describes a system that would not work for coldworking holes for the purpose of improving fatigue rated assemblies in aircraft. Coldworking holes requires accuracies in the vicinity of one ten-thousandth of an inch. Swage hose fittings, such as what Frye et al's invention is directed to, require accuracy of only two to five one-thousandths of an inch. Frye's conical "ram" or pilot enlarges or expands the mandrel well beyond its free state. Frye's mandrel, after being significantly enlarged during each process, would be required to be frequently tested in insure that the exacting dimensions required were still being met. Further, the relative axial position of the conical pilot and the mandrel changes the outer diameter of the mandrel. If this system were used in coldworking holes, a slight variation in the axial position of the conical pilot and the mandrel would result in a larger or smaller diameter of the mandrel. A change in the mandrel's diameter from one operation to the next operation would be cause for rejection of the tool. The relative position of the conical pilot and mandrel of Frye may be changed very easily due to small debris, high forces, or being out of proper adjustment. The cylindrical pilot and mandrel of the present invention, however, is not sensitive to relative axial position. Successive coldworked holes will then be exactly the same diameter even if the pilot is in a slightly different axial position within the mandrel. In other words, to operate properly, the pilot of the present invention must be in the correct position, however, slight variation from that position will not have an impact at all on the diameter of the cold worked holes.

It should also be pointed out that although Frye et al and the present invention both contain slots in the mandrel, their purpose in each invention is different. Frye et al enters the hose coupling with his mandrel at full diameter. As he progressively expands the hose coupling, the outer diameter of the mandrel increases. The slots in the present invention are present to allow the mandrel to collapse or contract during insertion into the hole to be cold worked. As the cylindrical pilot is withdrawn into the mandrel, the mandrel expands but never beyond its original diameter "free state." As the mandrel and pilot are pulled through the hole the mandrel's outside diameter is no greater than at its "free state" or original machined dimension. Workability is obtained when compared to Frye et al since successive coldworked holes are continually cold worked at exactly the same mandrel diameter which is mandatory.

Another patent in the prior art is U.S. Pat. No. 2,508,377 issued to Doerr. Doerr shows a cylindrical pilot as does the present invention, but is not considered applicable since a mandrel isn't taught in conjunction with the pilot.

SUMMARY OF THE INVENTION

The present invention herein described is an improvement in the coldworking process of holes especially in the manufacture of airplanes which eliminates the need for "throw away" pre-lubricated sleeves while producing fatigue performance as good or better than the prior art.

In general, this method for coldworking holes comprises the steps of inserting a mandrel containing a pilot into a hole to be coldworked. In one embodiment, the mandrel has radially directed slots which permit its collapse as it is placed through the holes to be coldworked. The pilot is contained within the mandrel and has a large diameter which extends outside the mandrel. This larger diameter is smaller than the hole to be coldworked, yet larger than the portion of the pilot initially within the mandrel so as to permit the mandrel and pilot to fit within the hole to be coldworked. To coldwork the hole, the pilot is pulled back through the mandrel with the larger diameter solidifying the mandrel. The mandrel has been precisely machined to receive the large diameter end of the pilot without expanding beyond its original "free state" diameter. The solidified mandrel can then transmit a force in a radial direction. This force is transmitted to the hole causing coldworking when the mandrel and the pilot are retracted from the hole. It should be noted that in the retracting operation both the pilot and mandrel are experiencing axial tensile forces, and are sharing the pulling load which results in lower tool stresses and longer tool life.

The apparatus used to practice the present invention consists of three concentrically mounted assemblies, the innermost assembly can be called the pilot assembly, the center assembly shall be called the mandrel assembly and the outer assembly is called the barrel assembly. The barrel assembly is fixedly mounted to the housing of a conventional puller gun and this assembly provides a cylindrical guide for the other two assemblies as well as a pushing shoulder that pushes against the workpiece during the pulling operation. The mandrel assembly is spring biased to an extended position and "floats" between the inner and outer assemblies having no direct contact with the puller gun. The pilot assembly is fixedly mounted to the puller ram of the puller gun through a coupler. The puller ram pulls on the pilot assembly which slides in the mandrel assembly until a shoulder of the pilot assembly contacts a shoulder of the mandrel assembly. The biasing spring retains the split mandrel assembly in an extended position during this part of the operation. Then the two assemblies slide as one unit within the barrel assembly. The contacting shoulders between the two assemblies are inboard of the pilot and mandrel such that both the pilot and the mandrel are in tension and neither of them is in compression in the axial direction. Of course the mandrel will be in radial compression during expansion of the hole. After the pulling operation is complete, the puller ram is returned to its original position.

In a preferred embodiment of the invention the mandrel is split into more than two sections to provide for a more symmetrical and uniform coldworking of the hole. Splitting into more than two sections is possible because all of the members of the mandrel and the pilot are in tension during pulling and so are not stressed beyond their endurance. All of the members pulling in one direction lightens the load of any one member. The holes are more round in appeareance and require less reaming. In addition, when there are more than two segments to the mandrel the travel of each segment is less. Consequently, any ridges produced in the workpiece are smaller in width and in height.

Also, in another embodiment of the invention the mandrel is split into more than two sections to provide for a more symmetrical and uniform coldworking of the holes wherein the split has an offset such that no ridges are left in the hole. While it can be appreciated that no ridges will be superior in quality and appearance than smaller ridges, it is also apparent that the manufacture of an offset split in hardened mandrels is an expensive process and therefore both types of mandrels are disclosed as embodiment forms of the invention. The offset split occurs at a reduced diameter portion of the mandrel located centrally between two larger diameter portions, such that both of the larger diameter portions effect coldworking and the reduced diameter portion is to provide clearance for the offset in the split. This prevents the hole from being scraped by the mismatched portions of the offset in the split during the time that the mandrel is solidified. This offset split mandrel offers a uniquely clean and symmetrical coldworked hole.

It is therefore an object of the present invention to provide a method for coldworking of holes which reduces the need for two operators.

It is a further object of the present invention to provide a method and apparatus for coldworking holes which does not require the use of throw-away sleeves, while producing the same or better fatigue performance.

Yet another object of the present invention is to provide a method and apparatus for coldworking holes which is as good as the prior art yet is significatnly less expensive.

Another object of the present invention is to provide a tool assembly for coldworking holes which produces a more symmetrical, higher quality coldworked hole.

Yet another object of the invention is to provide a hole expanding tool assembly with a split mandrel, wherein both the pilot and the mandrel are under tensile stress during the pulling operaton. This embodiment provides for a sharing of the pulling load by the pilot and the split mandrel which results in lower tool stresses and longer tool life.

Still another object of the present invention is to provide an assembly which fits onto a conventional puller gun without requiring special adapting means.

Another object of the present invention is to provide a method of coldworking holes which will leave no ridges in the hole.

BRIEF DESCRIPTION OF THE DRAWINGS

These and other objects and advantages of the present invention will become more apparent from the following description taken in conjunction with the accompanying drawings. In the drawings.

DETAILED DESCRIPTION OF THE PREFERRED EMBODIMENT

Figure 1:
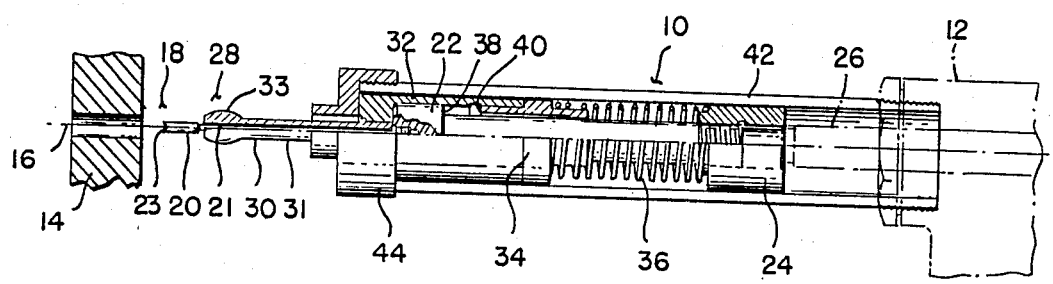
FIG. 1 shows a sectional view of the concentric assemblies of the present invention at a "rest state" prior to insertion into a hole to be coldworked.

Referring to FIG. 1, a split mandrel hole expanding tool assembly, generally designated as 10, is shown. The assembly 10 is mounted to puller gun 12. A workpiece 14 having a hole 16 to be coldworked is shown to the left of the assembly 10. Hole 16 is of such a diameter that pulling the split mandrel assembly 10 through it will cause coldworking.

The tool assembly 10 contains a pilot assembly, generally designated as 18, which has a pilot 20, a rod 22, and a coupler 24. Pilot 20 has a small diameter portion 21 contained within the tool assembly 10, and a large diameter portion 23 extending outside of the tool assembly 10 prior to operation of the tool. The pilot 20 is threaded to the rod 22 which in turn is threaded to coupler 24. Coupler 24 is also threaded to the puller ram 26 of puller gun 12. The puller ram 26 of puller gun 12 transports left and right taking the pilot assembly 18 with it.

Figure 5:
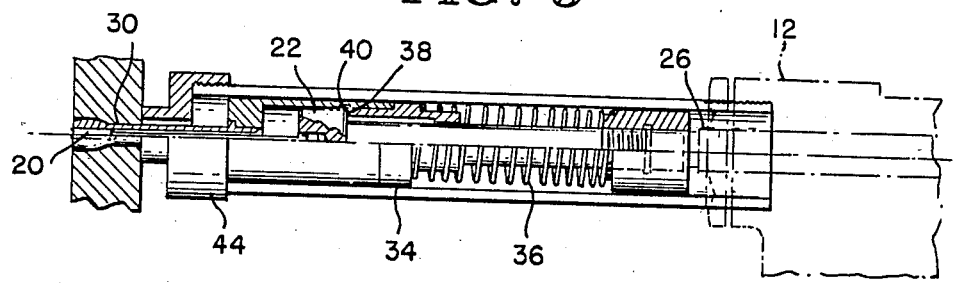
FIG. 5 shows a sectional view as in FIG. 1 of the present invention as the pilot and mandrel are retracted through the hole thereby coldworking the hole.

The tool assembly 10 also contains a split mandrel assembly, generally designated as 28, which consists of split mandrel 30, housing 32, plug 34, and spring 36. Split mandrel 30 has a straight portion 31 and a flared portion 33 which is adapted to receive the pilot 20. Split mandrel 30 is threaded to housing 32, which in turn is threaded to plug 34. Spring 36 is located between coupler 24 of the pilot assembly 18, and plug 34 of the mandrel assembly 28. Spring 36 biases the mandrel assembly 28 to the left by pushing on coupler 24 which is secured to puller ram 26. The mandrel assembly 28 is extended due to this bias. Rod 22 has a shoulder 38 which contacts another shoulder 40 of plug 34 of the mandrel assembly during retraction as best shown in FIG. 5. This contact enables the pilot assembly 18 and mandrel assembly 28 to travel in unison to the right during retraction.

Pilot assembly 18 and mandrel assembly 28 are contained partially within a barrel 42. Barrel 42 is fixedly attached to the puller gun 12 at one end and a cap 44 at the other end. The cap 44 retains the mandrel assembly 28 in barrel 42 and serves as a guide for coupler 24 of pilot assembly. The barrel 42 also contains spring 36 and guides it during operation.

Figure 6:
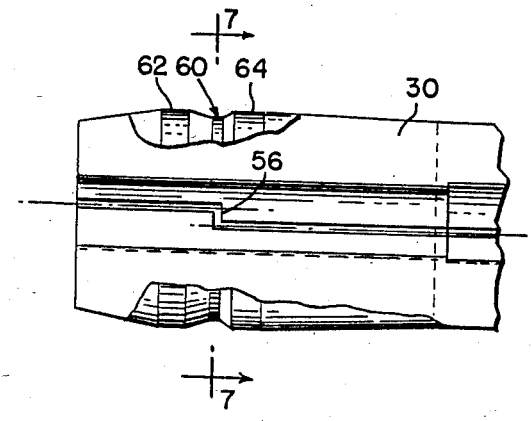
FIG. 6 is an enlarged view of the split mandrel nose, showing the offset split embodiment.
Figure 7:
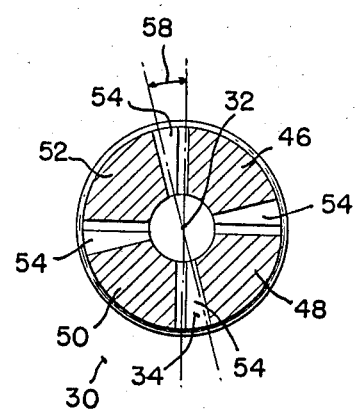
FIG. 7 is a sectional view of the offset split mandrel viewed from the left through line 7—7 of FIG. 6.

Referring now to FIGS. 6 and 7, an embodiment of split mandrel assembly 28 is shown wherein mandrel 30 has four segments designated as segments 46, 48, 50 and 52 with an offset split 54 between each segment. FIG. 6 shows the offset 56 of offset split 54. The offset split 54 is accomplished by sweeping a split cut through an angle 58 (FIG. 7) about the longitudinal axis of mandrel 30. It should be noted that offset 56 of offset split 54 is located in a recessed diameter portion 60 of mandrel 30. Recessed diameter portion 60 of mandrel 30 is located between coldworking diameter portions 62 and 64 of mandrel 30. Locating offset 56 of offset split 54 in recessed diameter portion 60 of mandrel 30 beteween coldworking diameter portions 62 and 64 provides a means of pulling two coldworking diameter portions through one hole in succession with each portion having a different radial location for its split. The result of this configuration will be that the coldworked hole 16 will have a clean bore with no ridges or extraneous marks from offset 56 or offset split 54. The present invention may also be practiced without an offset split 54. The mandrel 30, in this case, would still be divided into four segments similar to segments 46, 48, 50 and 52 in FIG. 7, but it would have no offset. As this type of mandrel is retracted through hole 16 in workpiece 14, small ridges would occur at four radial locations. There ridges could be reamed after coldworking.

Figure 2:
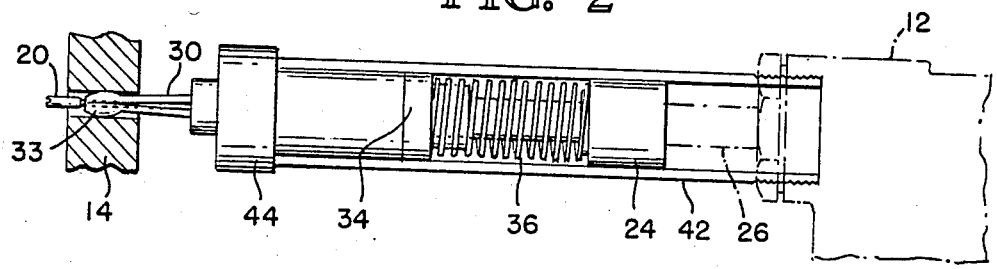
FIG. 2 shows a sectional view as in FIG. 1 of the present invention as the pilot and mandrel are inserted into a hole to be coldworked.
Figure 3:
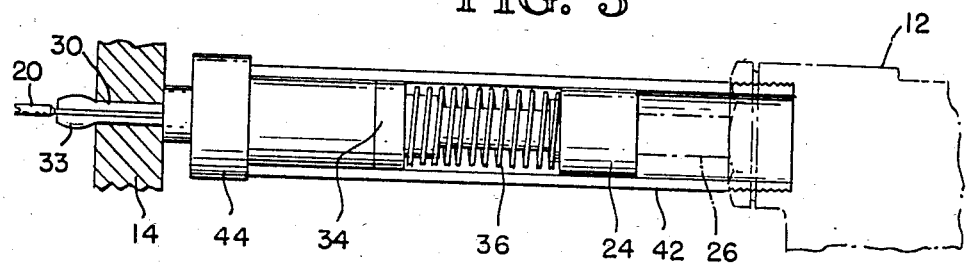
FIG. 3 shows a sectional view as in FIG. 1 of the present invention as the pilot and mandrel are fully inserted in a hole to be coldworked prior to retraction of the pilot.
Figure 4:
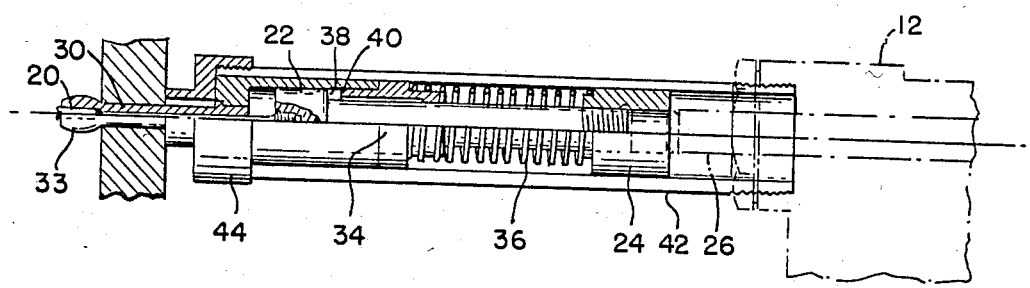
FIG. 4 shows a sectional view as in FIG. 1 of the present invention as the pilot is retracted into the mandrel solidifying the mandrel prior to retraction of the pilot and mandrel.

To operate the tool, an operator would place pilot 20 and mandrel 30 into hole 16 of workpiece 14 until the cap 44 contacts the surface of workpiece 14 as shown in FIGS. 2 and 3. As contact between cap 44 and workpiece 14 is maintained, retraction of puller ram 26 of puller gun 12 can be initiated. This retraction operation would normally be accomplished by activation of a trigger (not shown) located in puller gun 12. The puller ram 26 which is fastened to pilot 20 via rod 22 and coupler 24 will cause pilot 20 to retract engaging the pilot 20 in the flared portion 33 of mandrel 30 as shown in FIG. 4. After the pilot 20 engages mandrel 30, shoulder 38 of rod 22 and shoulder 40 of plug 34 will contact. The mandrel 30, which has now been solidified by pilot 20, will retract with the puller ram 26. It should be noted that in contrast to the swaging or hose coupling art, pilot 20 does not expand mandrel 30 beyond its original diameter when pilot 20 is retracted. The mandrel 30 is precisely machined to receive pilot 20, and is solidified rather than expanded when pilot 20 is retracted into it. As shown in FIG. 5, pilot 20 and mandrel 30 will retract through hole 16 together, being maintained in axial tension and effect coldworking of hole 16. Pilot 20 and mandrel 30 are being pulled through hole 16 by the action of puller ram 26. This pulling places pilot 20 and mandrel 30 in tension in such a way that each are under less stress with respect to prior art concepts and tool longevity is assured. As mentioned previously, one of the prior art concepts pulled the pilot which pushed the mandrel through the hole and caused tool failure problems.

The invention may be embodied in other forms without departing from the spirit of essential characteristics thereof. The present embodiments are therefore to be considered in all respects as illustrative and not restrictive. The scope of the invention being indicated by the appended claims rather than by the foregoing description, and all changes which come within the meansing and range of equivalency of the claims are therefore intended to be embraced therein.

What I claim is as follows:

1. A method for coldworking holes comprising:
   a. inserting a mandrel having a larger tapered portion into a hole in an associated workpiece, said mandrel containing a pilot having a large diameter cylindrical end extending from the mandrel, and a small diameter end contained within the mandrel, said mandrel having at least two radially directed slots so as to permit collapse of the larger tapered portion of said mandrel during insertion into the hole, the larger tapered portion of said mandrel containing an enlarged cylindrical recess therein to matingly receive said large diameter cylindrical end of the pilot without expanding said mandrel;
   b. pulling the large diamter end of said pilot through the larger tapered portion of said mandrel until the large diameter end of said pilot is substantially within the enlarged cylindrical recess of the larger tapered portion of said mandrel thereby solidfying said mandrel without expanding said mandrel; and
   c. retracting said mandrel containing said pilot from the hole thereby compressing the mandrel in a radial direction taken from the center axis of the hole and causing the hole to be coldworked.

2. The method of claim 1 wherein said mandrel and said pilot are both in longitudinal tensile stress during retraction from the hole.

3. Apparatus for coldworking holes comprising:
   a. a mandrel having a larger tapered portion with at least two radially directed slots therein defining at least two segments of the mandrel to permit changing the outer diameter of the mandrel, and an axially directed slot through said mandrel, the larger tapered portion of said mandrel having an enlarged cylindrical recess;
   b. a pilot having a smaller diameter portion disposed within the axially directed slot of said mandrel, and a larger diameter cylindrical portion extending from said mandrel, the larger diameter cylindrical portion adapted to matingly fit in the enlarged cylindrical recess of said mandrel;
   c. a barrel for housing said mandrel containing said pilot;
   d. stopping means connected to said pilot and said mandrel for stopping the large diameter portion of said pilot at the point of full engagement within the enlarged recess of the larger tapered portion of said mandrel as said pilot is pulled through said mandrel, thereby solidfying said mandrel without expanding said mandrel; and
   e. retracting means connected to said mandrel and said pilot for pulling the larger diameter portion of said pilot into the enlarged recess of the larger tapered portion of said mandrel thereby engaging said stopping means and retracting said mandrel and said pilot through a hole to be coldworked.

4. The apparatus of claim 3 wherein said mandrel contains four radially directed slots defining four segments of the mandrel.

5. The apparatus of claim 4 wherein the larger tapered portion of said mandrel contains an annular recess extending around said larger tapered portion, and said four radially directed slots being offset at the annular recess of said larger tapered portion of said mandrel so that the outside surface of said mandrel contacts a different radial location of the coldworked hole as said mandrel is retracted from the hole.

* * * * *